United States Patent [19]

Bailey et al.

[11] Patent Number: 4,553,649
[45] Date of Patent: Nov. 19, 1985

[54] AXIAL RETENTION OF THE SHOE OF A DRUM BRAKE AND A DRUM-BRAKE SHOE EQUIPPED WITH AN AXIAL-RETENTION DEVICE

[75] Inventors: Ronald D. Bailey, Elyria, Ohio; Jacques Charbonnier, Clichy; Michel Chotard, Drancy, both of France

[73] Assignees: Allied Corporation, Morristown, N.J.; Societe Anonyme D.B.A., Paris, France

[21] Appl. No.: 557,563

[22] Filed: Dec. 2, 1983

[30] Foreign Application Priority Data

Mar. 11, 1983 [FR] France ............................ 83 04044

[51] Int. Cl.[4] ............................................ F16D 65/02
[52] U.S. Cl. ................................. 188/340; 188/205 A; 188/326; 188/335; 192/30 V; 192/76; 267/182; 403/372
[58] Field of Search ............ 188/335, 340, 326, 205 A; 267/182; 403/365, 372; 192/30 V, 76

[56] References Cited

U.S. PATENT DOCUMENTS

| | | | |
|---|---|---|---|
| 2,062,078 | 11/1936 | Wenzel | 267/182 X |
| 2,305,768 | 12/1942 | Gente | 403/372 X |
| 2,466,425 | 4/1949 | House et al. | 60/54.6 |
| 2,671,535 | 3/1954 | House | 188/78 |
| 2,833,378 | 5/1958 | Main | 188/326 |
| 3,186,520 | 6/1965 | McCandlish | 188/78 |
| 3,795,292 | 3/1974 | Keller, Jr. | 188/340 |
| 3,869,027 | 3/1975 | Chlebowski | 188/340 |
| 4,141,437 | 2/1979 | Roberts | 188/340 |
| 4,361,214 | 11/1982 | Roberts | 188/355 |

FOREIGN PATENT DOCUMENTS

| | | |
|---|---|---|
| 1201627 | 9/1965 | Fed. Rep. of Germany . |
| 1295394 | 5/1962 | France . |
| 2418384 | 9/1979 | France . |

Primary Examiner—George E. A. Halvosa
Attorney, Agent, or Firm—Ken C. Decker; Larry J. Palguta

[57] ABSTRACT

A drum brake assembly includes a pair of brake shoes which are slidably mounted on a fixed support. An elastic retention member is mounted on each of the shoes before they are assembled onto the fixed support. Each of the retention members includes a locking portion which engages the web of the brake shoes, and a pair of arm portions which extend from the locking portions and which engage the web of the brake shoe in such a way as to releasably maintain the locking portion engaged with the web of the brake shoe. When the brake shoes are assembled on the torque member, a portion of the torque member is provided with a sloped edge that engages the locking portion to release the latter as the brake shoes are assembled onto the fixed support, so that the retaining member then exerts a biasing force between the torque member and the brake shoes.

6 Claims, 5 Drawing Figures

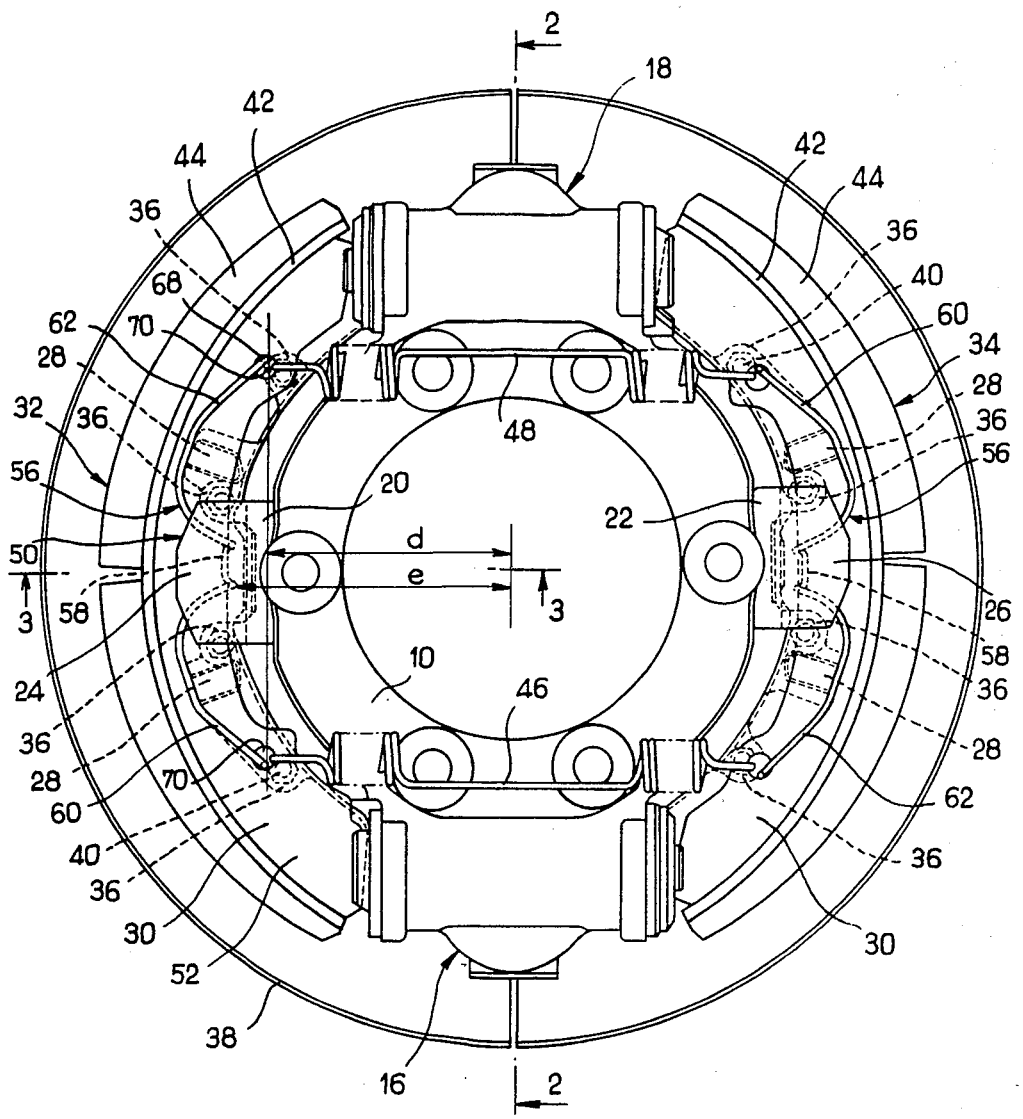
FIG_1

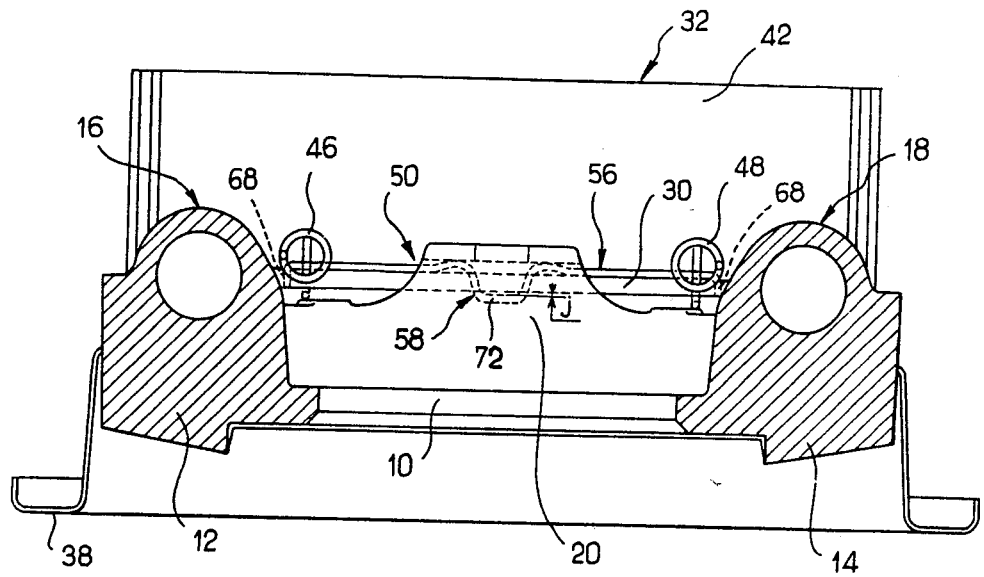
FIG_2
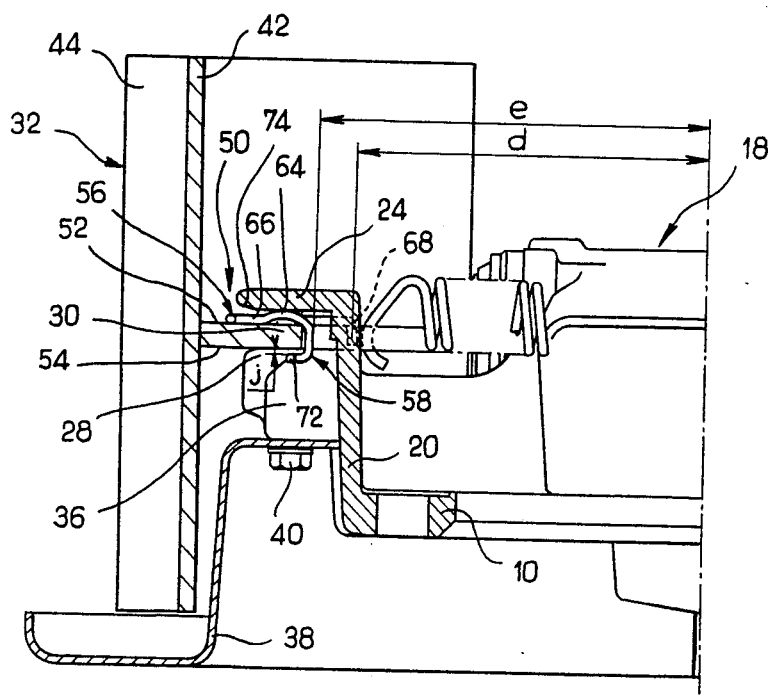
FIG_3

AXIAL RETENTION OF THE SHOE OF A DRUM BRAKE AND A DRUM-BRAKE SHOE EQUIPPED WITH AN AXIAL-RETENTION DEVICE

The subject of the invention is an improvement to the axial retention of the shoe of a drum brake, especially for a motor vehicle, and a drum-brake shoe equipped with a device for the axial retention of the shoes.

The invention relates more particularly to an improvement to the axial retention of the shoe of a drum brake which incorporates a fixed support receiving, so as to slide therein, two shoes capable of being moved apart by means of at least one brake motor located between two adjacent ends of the said shoes, said support incorporating in line with each shoe an axial arm, the free end of which extends radially outwards, a retention device being located between said free end and said shoe so as to apply the latter axially on the fixed support.

A brake of this type is described in U.S. Pat. No. 2,466,425, in which axial arms ending in radial arms 36 keep the shoe up against the fixed support. Nevertheless, this brake has two disadvantages, that is to say either the distance between the arm and the web of the shoe is short and requires very close tolerances or the play between the arm and the web of the shoe is greater, but in this case the arm 36 retains the shoe insufficiently and the brake can generate noise during braking.

U.S. Pat. No. 3,186,520 has proposed a brake of the type mentioned above, in which the axial arm and the radial arm are formed by components added to the fixed support, a spring being located between the radial arm and the web of the shoe in such a way as to lay the latter against the fixed support. Although this solution solves the problem of tolerances, it nevertheless has the major disadvantage that the various components are floating and it is especially difficult to install the spring when it has to be stressed to be effective. This is all the more so if the brake is located on the vehicle and the central part of the brake is occupied by the wheel hub.

The invention aims to propose an improvement to the axial retention of the shoes of a drum brake in which such disadvantages are avoided.

For this purpose, the invention proposes a drum brake of the type mentioned above, in which the retention device comprises an elastic element and a locking element which ensures a prestress on said elastic element when the shoe is not fitted on the fixed support, said locking element becoming inoperative when the shoe and the retention device are in the operative position under the free end of said arm.

By means of this arrangement, the elastic retention element is prestressed when the shoe is unattached, and consequently this operation is easy to carry out, and the fitting of the shoe on the brake requires no additional operation on the retention device since by being released the latter allows the elastic element to exert the axial force necessary for laying the shoe against the fixed support.

An embodiment will now be described by way of non limiting example, with reference to the attached figures in which:

FIG. 1 is an axial view of a drum brake produced according to the invention;

FIG. 2 is a sectional view along the line 2—2 of the FIG. 1;

FIG. 3 is an enlarged sectional view along the line 3—3 of the FIG. 1;

Figure 4:
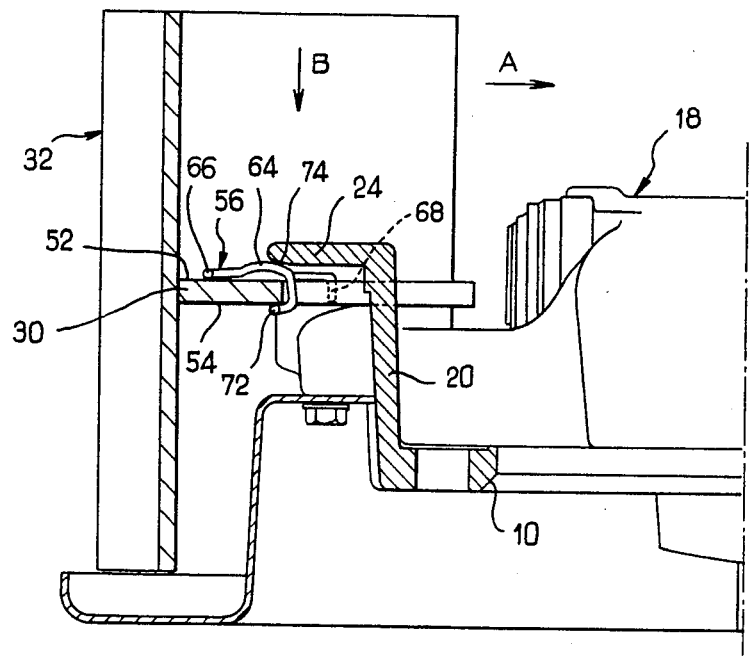
FIG. 4 is a view similar to FIG. 3, the shoe being offered on the fixed support, but not being finally installed.
Figure 5:
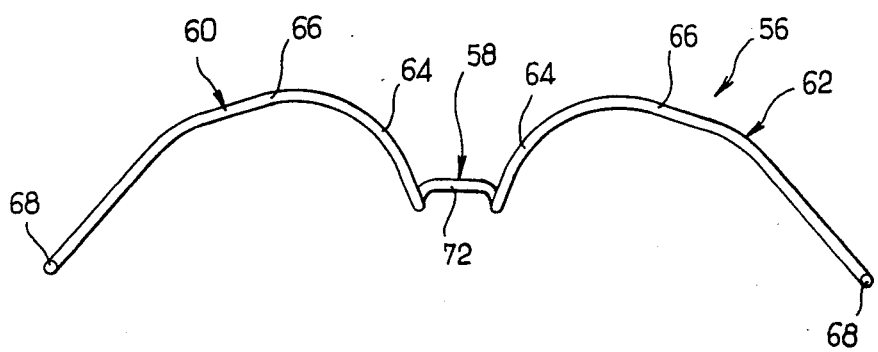
FIG. 5 is an enlarged axial view of the elastic axial-retention element illustrated in FIG. 1.

The drum brake illustrated in FIGS. 1 to 3 incorporates a fixed support 10 intended to be associated with a fixed part of the vehicle (not shown) and consisting, in the embodiment illustrated, of a cast article possessing a certain number of bosses. Referring to FIG. 2, it will be seen that two of these bosses 12 and 14 form the bodies of two brake motors 16 and 18 located diametrically on the fixed support. Two other bosses 20 and 22, likewise spaced diametrically, but along a diameter perpendicular to the bosses 16 and 18, form two axial arms 20, 22, the free ends 24 and 26 of which extend radially outwards. Referring to FIGS. 1 and 3, it will be seen that the fixed support incorporates two other series of bosses, a first series 28 intended for supporting the webs 30 of two shoes 32 and 34 and a second series of bosses 36 intended for supporting a protective plate 38 screwed to the bosses 36 by means of screws 40. Referring to FIG. 1, it will be seen that the shoes 32 and 34, in addition to the web 30, incorporate a curved rim 42 on which a friction lining 44 is fastened. The shoes 32 and 34 are located on either side of the brake motors 16 and 18 to which they are applied by means of springs 46 and 48 respectively.

According to the invention, each of the shoes 32 and 34 incorporates a retention device designated as a whole by reference numeral 50. If a first face of the web 30, which can be seen in FIG. 1, is designated by 52 and the other or second face of the web 30 is designated by 54, it will be seen that this second face 54 rests on the bosses 28, whilst the first face 52 is located opposite the free end 24 of the arm 20, which may be seen by reference to FIG. 3. It is quite clear that the shoe 34 is fitted in a similar, but symmetrical way. The retention device 50 comprises an elastic element 56 formed, in the embodiment illustrated, by a spring made of spring wire. Referring to FIGS. 1 to 5, it will be seen that the spring 56 is formed by a central portion 58 to which are connected on either side two symmetrical arms 60 and 62, each comprising a first bearing region 64 interacting with the free arm 24 and a second bearing region 66 interacting with the first face 52 of the web 30. Finally, the free ends of the arms 60 and 62 have folded-back portions 68 which penetrate into perforations 70 made in the web 30 of the shoes 32 and 34. Referring to FIGS. 1 and 3, it will be seen that the line joining the two folded-back portions 68 is located at a distance d from the centre of the brake, which is less than the distance e between the centre of the brake and the central portion 58 of the elastic element 56. Referring to FIGS. 2 and 3, it will be seen that the central portion 58 of the elastic element 56 takes the form of a U in an axial plane, the central branch 72 of the U being folded-back radially outwards so as to take hold of the web 30 of the shoe 32 in the manner of a yoke, without gripping it, thus forming a locking element. As may be seen in FIG. 3, the free end 24 has, on its face located opposite the web 30, a slope 74 which extends away from the face 52 of the web 30 in proportion to the increasing distance from the centre of the brake in a radial direction. If the play existing between the branch 72 of the spring 56 and the second face 54 of the web 30 when the shoe is installed is designated by j, the inclination of the slope 74 will be defined so that its clearance is greater than j.

The brake which has just been described with reference to FIGS. 1 to 5 is assembled in the following way:

The fixed support 10 is equipped beforehand with the brake motors 16 and 18. The fixed support 10 is previously equipped with the protective plate 38 attached by means of the screws 40 to the bosses 36, but it is also possible to attach the protective plate 38 after the brake has been assembled. The springs 56 are then fitted on the shoes 32 and 34, the latter having previously been equipped with the linings 44. The springs 56 are fitted on the shoes in the following way: one of the folded-back portions 68 is introduced into one of the perforations 70. The central portion 58 is then brought up to the web of the shoe in such a way that after the axial compression of the spring 56 the portion 72 passes under the web of the shoe. The other folded-back portion 68 is introduced into the second perforation 70, during which, on the one hand, the spring 56 is compressed axially and, on the other hand, since the distance between the two portions 68 is greater than the distance between the two perforations 70, it is necessary to exert a circumferential force on the spring 56. This circumferential force guarantees that the central portion 58 is positioned so as to bear on the web 30 of the shoe, this being because the distance d defined above is less than the distance e also defined above. The shoe is then installed on the fixed support 10. Referring to FIG. 4 in which the shoe is brought up, but is not yet installed, it will be seen that the spring 56 is prestressed on the shoe 32; in fact the locking portion 72 is kept in contact with the face 54 of the web 30. As may be seen clearly in FIG. 4, the first bearing region 64 is ready to engage under the slope 74, but cannot engage freely under the free end 24. When the shoe 32 is pushed in the direction of the arrow A in FIG. 4, the first bearing region 64 initially comes in contact with the slope 74. Additional displacement in the direction of the arrow A compresses the spring 56 in the direction of the arrow B because of the slope 74 formed on the free end 24. The portion 72 of the spring 56 consequently disengages from the face 54 of the web 30 in proportion as the shoe penetrates in the direction of the arrow A, until there is the play j between this arm 72 and the face 54. The force laying the shoe 32 against the boss 28 therefore consists of two forces, a first force corresponding to the prestress of this spring defined by the initial locking of the spring 56 on the web 30 and a second force corresponding to the additional bending produced by the slope 74 during the fitting of the shoe.

It will therefore be noted that initially the spring 56 was fitted prestressed on the web 30 by means of the locking element 58 and that because of the free end 24 and, more precisely, the slope 74 formed on this free end, on the one hand the locking element becomes inopera tive when the shoe is installed, thus acting as a release device, and on the other hand this slope 74 increases the bearing force of the shoe on its fixed support. During the penetration of the shoe in the direction of the arrow A (see FIG. 4), the friction occuring between the spring 56 and the free end 24 of the arm 20 tends to displace the spring relative to the web 30 in the opposite direction to the arrow A. Under the effect of this friction, the two axial branches of the U of the central portion 58 bear on the edge of the web 30 and confirm the distance e defined above, making any accidental radial displacement of the spring 56 impossible.

When the two shoes 32 and 34 have been installed in this way, the springs 46 and 48, which keep the two shoes 32 and 34 up against the two brake motors 16 and 18, are fitted in a conventional way.

It will be understood from the foregoing description that the fitting of the shoes is simplified considerably in this way, the springs 56 having been fitted under prestress when the shoe is easily accessible, the installation of the shoe on the fixed support requiring no additional action on the retention devices which become normally operative simply by being introduced under the free ends 24 of the arms 20.

It is clear that the invention is not limited to the embodiment described and that the brake and the elastic element 56 can undergo modifications of form without departing from the scope of the present invention. In particular, the locking element 72 can be produced in a different way and can, for example, form part of the web 30 of the shoe, keeping a portion of the spring 56 axially prestressed.

We claim:

1. Drum brake assembly comprising a fixed support, a pair of brake shoes slidably mounted on said fixed support, each of said shoes having an end adjacent a corresponding adjacent end of the other brake shoe, a brake motor located between said adjacent ends, each of said brake shoes including an arcurate web having a pair of opposite faces, boss means on said fixed support slidably engaging one face of said webs, said fixed support including arm means including a radially projecting portion cooperating with the boss means for receiving said webs therebetween when said brake shoes are installed on the fixed support, and an elastic retention member including a locking portion engaging said one face of said web before said brake shoes are installed on the fixed support and a pair of resilient arm members extending from the locking portion engaging the other face of said web, said resilient arm members engaging said web on portions of the latter offset from the portion of the web engaged by the locking portion to thereby prestress the retention member against said web, said retention member including release means for cooperating with the radially projecting portion of the arm means to release said locking means from said one face of said web when the brake shoes are installed on said fixed support.

2. Drum brake assembly as claimed in claim 1, wherein said release means is a first bearing region on each of said resilient arm members, each of said resilient arm members further including a second bearing region engaging said other face of said webs.

3. Drum brake as claimed in claim 2, wherein said resilient arm members have folded-back portions, said web having perforations, the folded-back portions of the resilient arm members being received in the perforation in the web, the plane defined by said folded-back portions being located at a distance closer to the center defined by the curve of said arcuate brake shoes than the radial distance from said center at which said locking portion is located.

4. Drum brake as claimed in claim 3, wherein said first bearing region is displaced by said projecting portion to cause said locking portion to bear radially on said web to thereby confirm said radial distance from said center at which the locking portion is located to resist any radial outward displacement of the retention member relative to said webs.

5. Drum brake assembly as claimed in claim 1, wherein said projecting portion of said arm means incorporates a release device cooperating with said release means to force said locking means away from said one face.

6. Drum brake as claimed in claim 5, wherein said release device comprises a sloping surface on said projecting portion.

* * * * *